United States Patent
Choi et al.

(10) Patent No.: US 7,239,900 B2
(45) Date of Patent: Jul. 3, 2007

(54) METHOD AND APPARATUS FOR DETECTING A POSITION OF A FOLDER IN A ROTATION TOUCH PHONE HAVING A CAMERA

(75) Inventors: Young Choi, Kumi-shi (KR);
Kwang-Yong Yang, Kumi-shi (KR)

(73) Assignee: Samsung Electronics, Co., Ltd., Suwon-Si (KR)

( * ) Notice: Subject to any disclaimer, the term of this patent is extended or adjusted under 35 U.S.C. 154(b) by 214 days.

(21) Appl. No.: 10/765,087

(22) Filed: Jan. 28, 2004

(65) Prior Publication Data

US 2004/0185920 A1    Sep. 23, 2004

(30) Foreign Application Priority Data

Jan. 30, 2003    (KR) ...................... 10-2003-0006429

(51) Int. Cl.
*H04M 1/00*    (2006.01)
(52) U.S. Cl. ............... 455/575.3; 455/575.1; 455/575.4; 455/550.1; 455/90.3
(58) Field of Classification Search ............. 455/575.1, 455/575.3, 565, 550.1, 566, 575.4, 90.3
See application file for complete search history.

(56) References Cited

U.S. PATENT DOCUMENTS

| | | | |
|---|---|---|---|
| 6,266,236 B1 * | 7/2001 | Ku et al. ..................... | 361/681 |
| 6,839,576 B2 * | 1/2005 | Aagaard et al. ......... | 455/575.1 |
| 6,999,802 B2 * | 2/2006 | Kim ......................... | 455/575.1 |
| 2003/0064758 A1 * | 4/2003 | Mizuta et al. .............. | 455/566 |
| 2003/0203747 A1 * | 10/2003 | Nagamine ................ | 455/575.3 |
| 2004/0204122 A1 * | 10/2004 | Opela et al. ................ | 455/565 |

FOREIGN PATENT DOCUMENTS

JP    2001-169166    *    6/2001

* cited by examiner

*Primary Examiner*—Duc M. Nguyen
*Assistant Examiner*—Wayne Cai
(74) *Attorney, Agent, or Firm*—Roylance, Abrams, Berdo & Goodman, L.L.P.

(57) ABSTRACT

Disclosed is a method and apparatus for detecting a position of a folder in a rotation touch phone having a camera. The rotation touch phone includes a sensor section, a folder, a body, and a connecting section. The folder has a magnet and the sensor section includes first, second and third sensors for detecting the magnet. The first and second sensors are located on the body and the third sensor is located on the connecting section. The connecting section connects the folder to the body. The folder is movable from first, second, third and fourth states. The first state signifies a state in which the folder is initially closed, the second state signifies a state in which the folder has been opened from the first state, the third state signifies a state in which the folder has been rotated substantially 180 degrees from the second state, and the fourth state signifies a state in which the folder has been closed from the third state. The method comprises the steps of: i) receiving a signal from the sensor section notifying that the sensor section detects the magnet; and ii) deciding that the folder is in at least one of the first to fourth states, based on the signal input from the sensor section.

10 Claims, 11 Drawing Sheets

METHOD AND APPARATUS FOR DETECTING A POSITION OF A FOLDER IN A ROTATION TOUCH PHONE HAVING A CAMERA

PRIORITY

This application claims priority to an application entitled "Method for detecting position of folder in rotation touch phone having camera" filed in the Korean Industrial Property Office on Jan. 30, 2003 and assigned Serial No. 2003-6429, the contents of which are incorporated herein by reference.

BACKGROUND OF THE INVENTION

1. Field of the Invention

The present invention relates to a rotation touch phone having a camera, more particularly to a method and apparatus for detecting a rotational state of a folder in a touch phone having a camera.

2. Description of the Related Art

Recently, cellular phones have become equipped with cameras and camcorders to provide various additional services in addition to the basic communication service. For example, in a cellular phone having a camera or a camcorder, a folder coupled to the cellular phone can be rotated when photographing an image by using the cellular phone, thereby improving convenience of use.

However, in order to establish communication via a phone call using a rotation type cellular phone having a camera in which the folder has been rotated, a user must align a speaker and a microphone in the same direction. That is, the user is required to rotate the folder to its normal position for making the communication. Thus, when the folder of the rotation cellular phone is rotated, the user must return the folder to its normal position before establishing communication with other users. In addition, when the user photographs an object in a dark setting using the camcorder or the camera without a flash, it is difficult to obtain distinct images.

SUMMARY OF THE INVENTION

Accordingly, the present invention has been made to solve the above-mentioned problems. A first object of the present invention is to provide a method and apparatus for detecting a position of a folder in a rotation touch phone having a camera.

A second object of the present invention is to provide a method and apparatus for converting a rotation touch phone having a camera into a speakerphone depending on a position of a folder.

A third object of the present invention is to provide a method and apparatus for utilizing a display section as an illumination depending on a position of a folder when photographing an object by using a rotation touch phone having a camera.

In order to substantially accomplish the above objects, there is provided a method and apparatus for detecting a folder position in a rotation touch phone having a camera. The rotation touch phone includes a sensor section, a folder, a body, and a connecting section. The folder has a magnet and the sensor section includes first, second and third sensors for detecting the magnet. The first and second sensors are located on the body and the third sensor is located on the connecting section. The connecting section connects the folder to the body. The folder is movable from first, second, third and fourth states. The first state signifies a state in which the folder is initially closed, the second state signifies a state in which the folder has been opened from the first state, the third state signifies a state in which the folder has been rotated substantially 180 degrees from the second state, and the fourth state signifies a state in which the folder has been closed from the third state. The method comprises the steps of: i) receiving a signal from the sensor section notifying that the sensor section detects the magnet; and ii) deciding that the folder is in at least one of the first to fourth states, based on the signal inputted from the sensor section.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENTS

Embodiments of the present invention will be described with reference to the accompanying drawings. In the following description of the present invention, a detailed description of known functions and configurations has been omitted for conciseness.

Figure 1A:
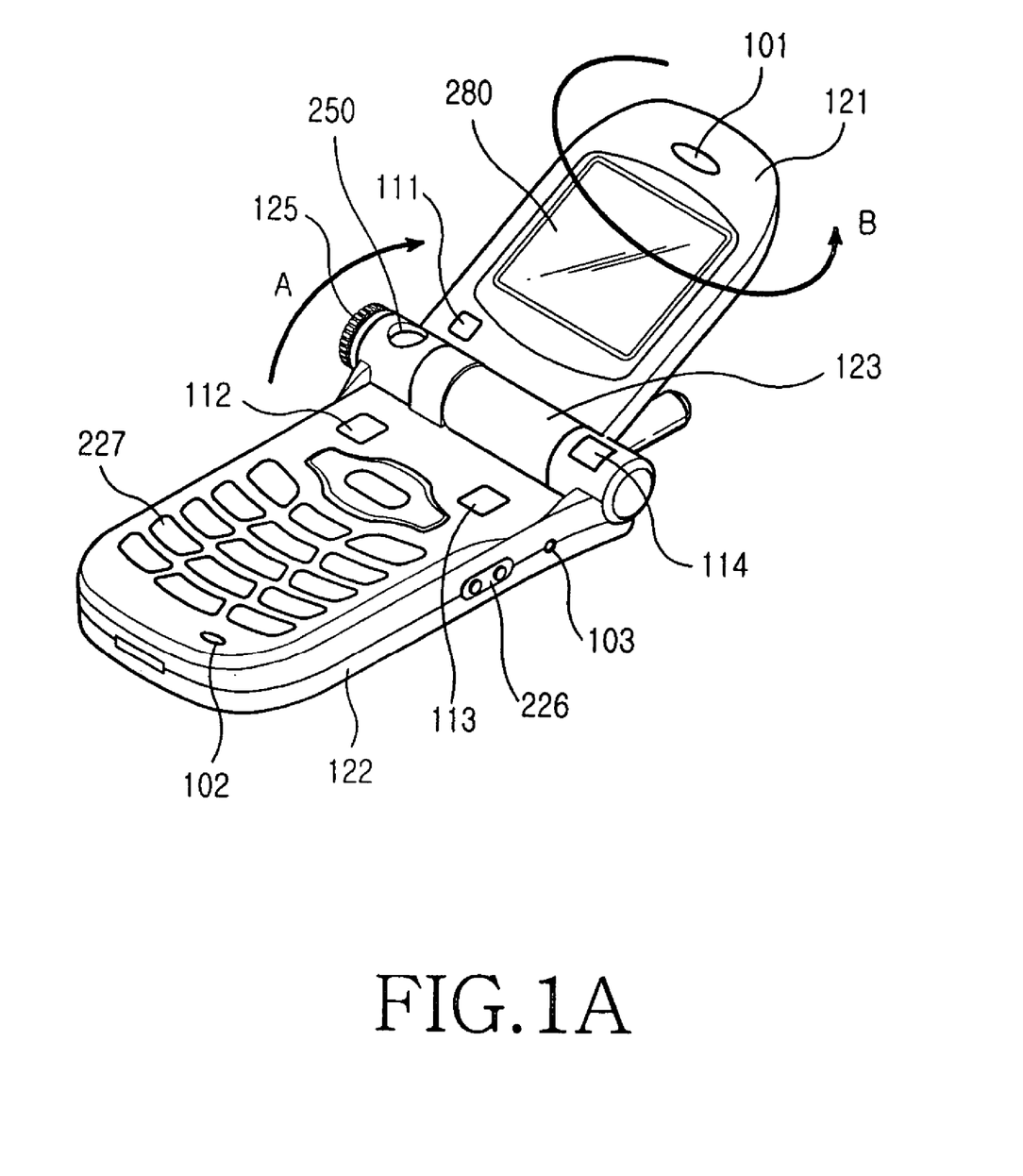
FIGS. 1A to 1C are perspective views illustrating examples of a rotational state of a folder of a rotation touch phone having a camera according to an embodiment of the present invention.
Figure 1B:
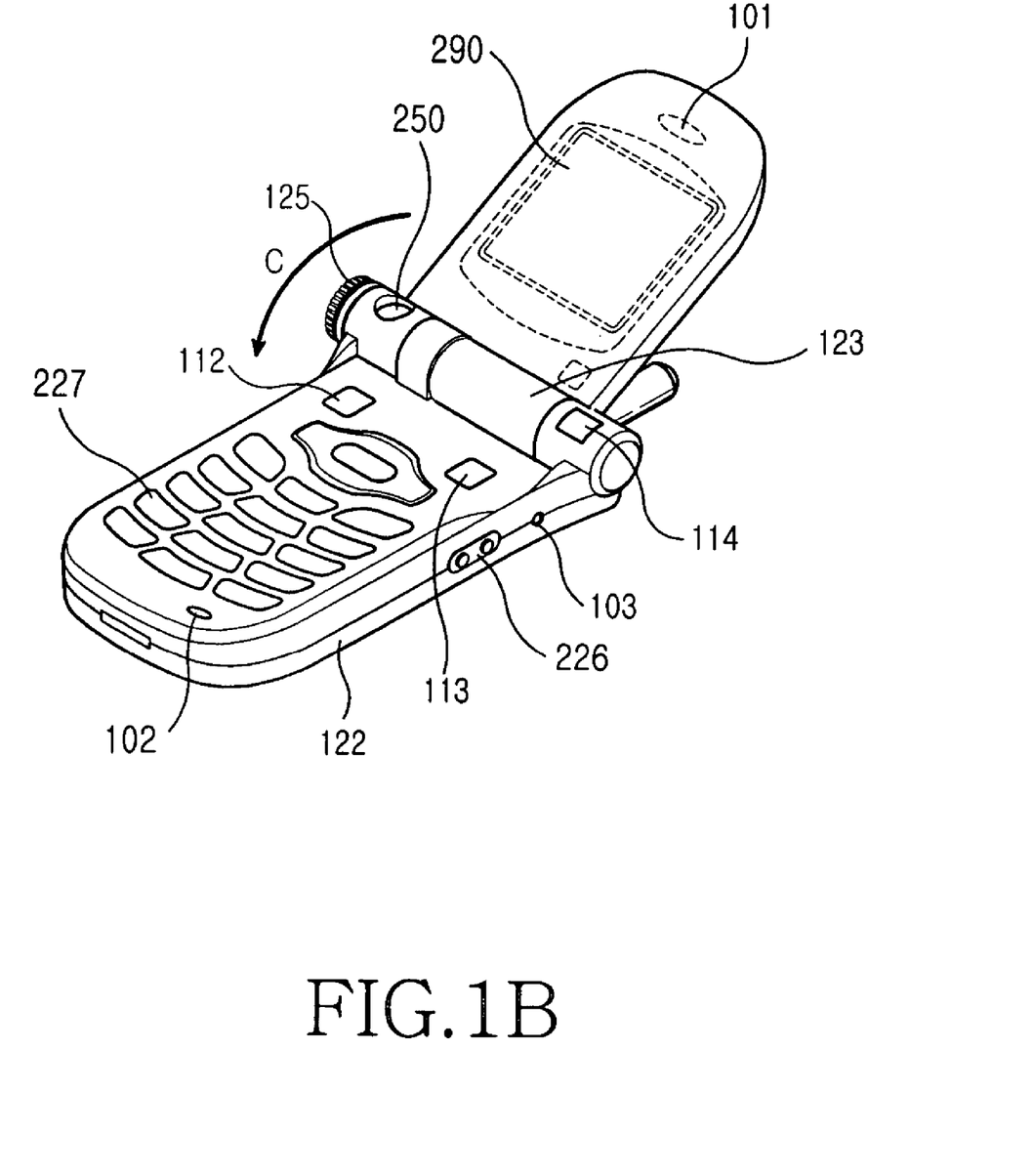
Figure 1C:
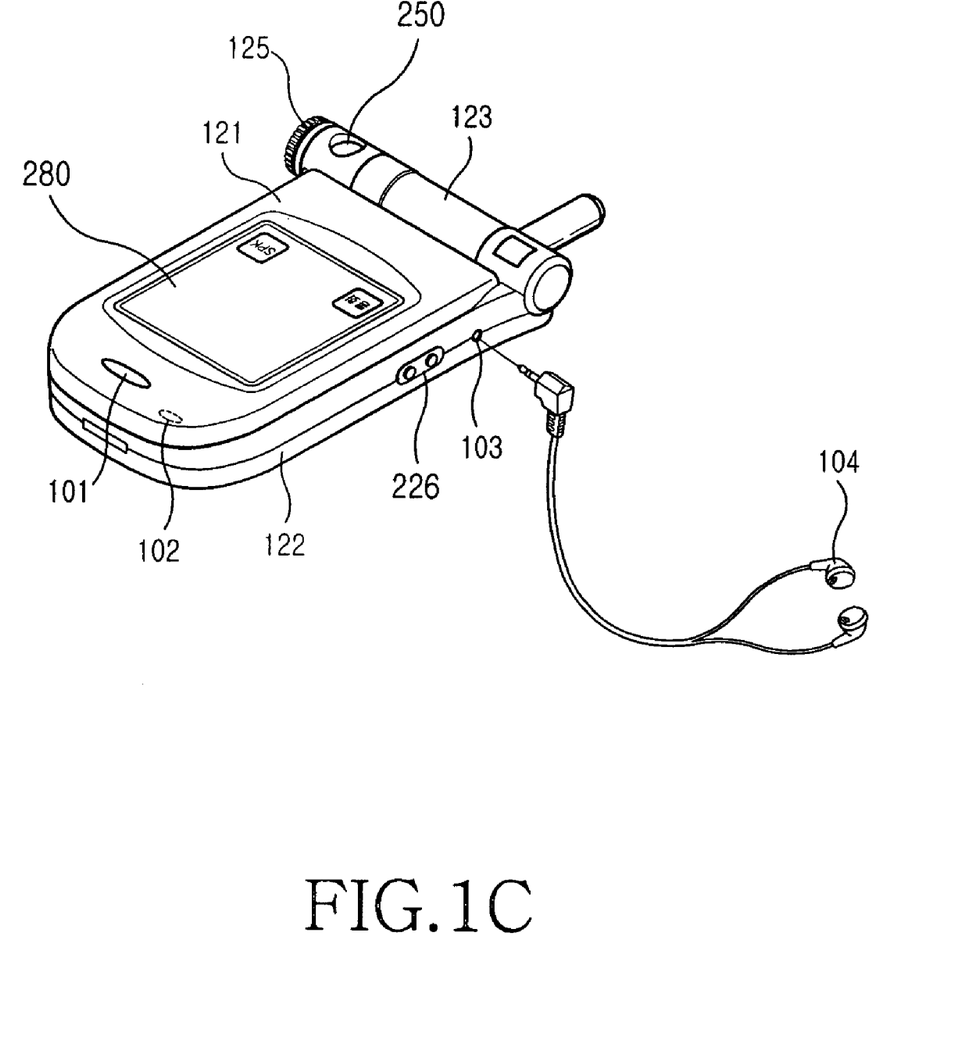

FIGS. 1A to 1C are perspective views illustrating examples of a rotational state of a folder of a rotation touch phone having a camera according to an embodiment of the present invention. The rotation touch phone having the camera is a folder type wireless communication terminal having a folder capable of rotating through 360 degrees and a touch screen.

Referring to FIGS. 1A to 1C, the rotation touch phone having the camera includes a body 122, a folder 121, and a connection section 123. The body 122 has a microphone 102, a key input section 227, a side key section 226 and an ear-jack 103. Hall effect ICs 112, 113 and 114 are accommodated in the body 122. The hall effect ICs can detect magnetic material, such as a magnet 111. Preferably, three hall effect ICs are provided. Two hall effect ICs are accommodated in the body 122 and the remaining one is provided at the connection section 123. In the present embodiment, two hall effect ICs accommodated in the body 122 are defined as first and second sensors 112 and 113. The connection section 123 includes a rotary hinge and one hall effect IC. The hall effect IC is provided at an inner portion of the connection section 123 and is defined as a third sensor 114. In addition, the connection section 123 includes a knob 125 and a camera 250. The folder 121 has a speaker 101, the magnet 111 and a first display section 280 having a liquid crystal display (LCD) that can display a first touch screen and on an opposing side a second display section 290 having a liquid crystal display that can display a second touch screen.

Although the speaker 101 is generally used for hearing a voice of other users, the speaker 101 according to the present invention has a speakerphone function. The speaker 101 described below is a bi-directional speaker having the function of the speakerphone. In addition, the magnet 111 can comprise any suitable magnetic or magnetizable material.

Hereinafter, a rotational state of the folder 121 in the rotation touch phone including the body 122, the connection section 123, and the folder 121 will be described. In the following description, a first state signifies a state in which the folder 121 is initially closed, a second state signifies a state in which the folder 121 has been opened in an "A" direction (See FIG. 1A), a third state signifies a state in which the folder 121 has been rotated in a "B" direction from the second state (See FIG. 1B), and a fourth state signifies a state in which the folder 121 has been closed in a "C" direction from the third state (See FIG. 1C).

Table 1 shows an operation of the rotation touch phone having the camera according to a position of the folder.

TABLE 1

| State of folder | 1st sensor | 2nd sensor | 3rd sensor | Operation |
|---|---|---|---|---|
| 1st state | HIGH | LOW | LOW | 1st display section OFF, 2nd display section ON, key input OFF, first touch screen OFF |
| 2nd state | LOW | LOW | LOW | 1st display section ON, 2nd display section ON, key input ON, first touch screen ON |
| 3rd state | LOW | LOW | HIGH | 1st display section ON, 2nd display section ON, key input ON, first touch screen OFF, rear speaker ON in communication |
| 4th state | LOW | HIGH | HIGH | 1st display section ON, 2nd display section OFF, key input OFF, first touch screen ON, speaker ON in communication |

Referring to table 1, in the rotation touch phone having the camera, if the magnet 111 reaches the sensors, each sensor displays "HIGH", and if the magnet 111 is remote from the sensors, each sensor displays "LOW". Since the folder 121 is closed in the first state, the first display section mounted in the inner part of said folder, the first touch screen 280 and the key input section 227 do not operate. However, the side-key 226 can be operated in order to establish communication.

According to embodiments of the present invention, the first display section 280 including a liquid crystal display (LCD) can also function as the first touch screen. However, second display section 290 as well as the first display section 280 also can be used as a second touch screen depending on a user's selection. Since the folder 121 is opened in the second state, the first and second display sections 280 and 290 and the key input section 227 are on and can be operated. In the third state, in which the folder 121 is rotated an angle of 180 degrees or about 180 degrees from the position of the second state, the first and second display sections and the touch screen are on and can be operated. In addition it is possible to operate the key input 227. The folder 121 is capable of being rotated 360 degrees. In the second and third states, the first and second display sections 280 and 290 can be used to provide illumination when the rotation touch phone is placed in a camera mode. A method for utilizing the first and second display sections 280 and 290 to provide illumination will be described in detail with reference to FIG. 6. As shown in FIG. 1C, in the fourth state, in which the folder 121 is moved into a closed position from the position in the third state, the first display section 280 and the touch screen 290 can be operated and the second display section 290 does not operate and operation of the key input 227 is impossible due to the phone being in a closed position. An operation of the rotation touch phone having the camera according to a state of the folder 121 will be described in detail with reference to FIGS. 5 and 6.

Figure 1D:
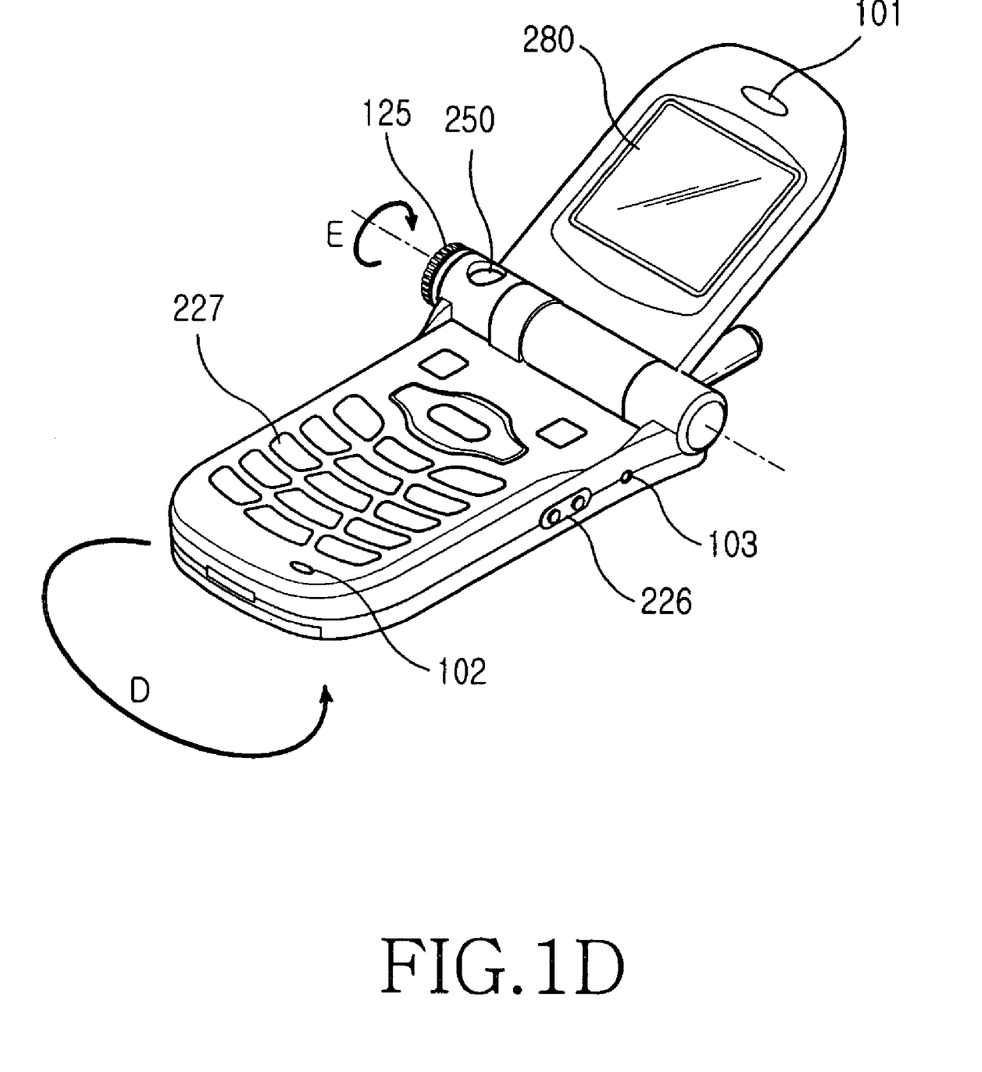
FIGS. 1D to 1F are a front perspective, a rear perspective, and a side views illustrating examples of a rotation touch phone having a camera according to an embodiment of the present invention.
Figure 1E:
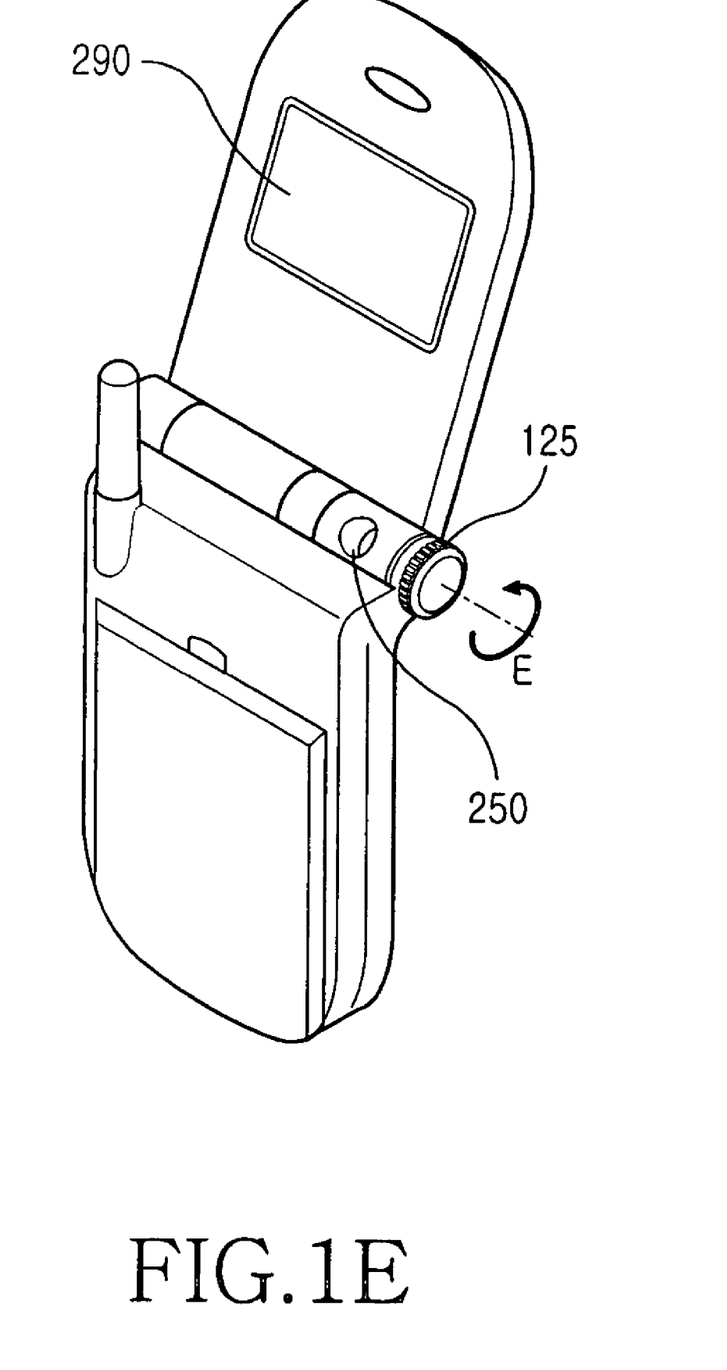
Figure 1F:
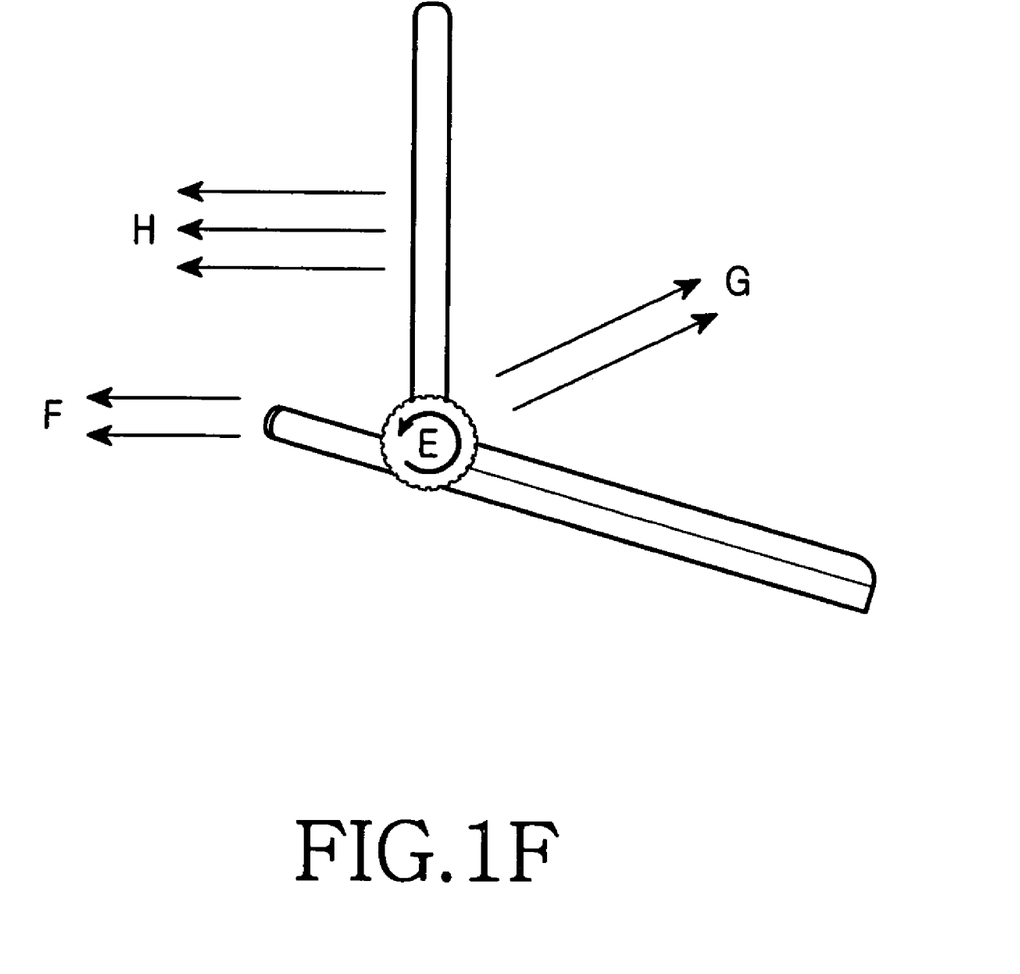

FIGS. 1D to 1F are a front perspective, a rear perspective, and a side view illustrating examples of a rotation touch phone having a camera according to an embodiment of the present invention. Hereinafter, an operation of the camera and a photographing method thereof will be described with reference to FIG. 1B.

FIG. 1D is a front view of the rotation touch phone showing the first display section 280 and the camera 250 in the second state. FIG. 1E is a rear view of the rotation touch phone, in which the camera 250 is rotated via the knob 125 in an "E" direction after the body of the rotation touch phone is rotated at an angle of 180 degrees or about 180 degrees in a "D" direction. FIG. 1F is a side view of the rotation touch phone having the camera 250, in which a "G" direction represents a photographing direction of the camera 250 when the rotation touch phone is maintained as shown in FIG. 1D, and an "F" direction represents a photographing direction of the camera 250 when the rotation touch phone is maintained as shown in FIG. 1E. In FIG. 1F, an "H" direction represents an illumination direction radiated from the second display section 290, which will be further described later with reference to FIG. 6.

Figure 2:
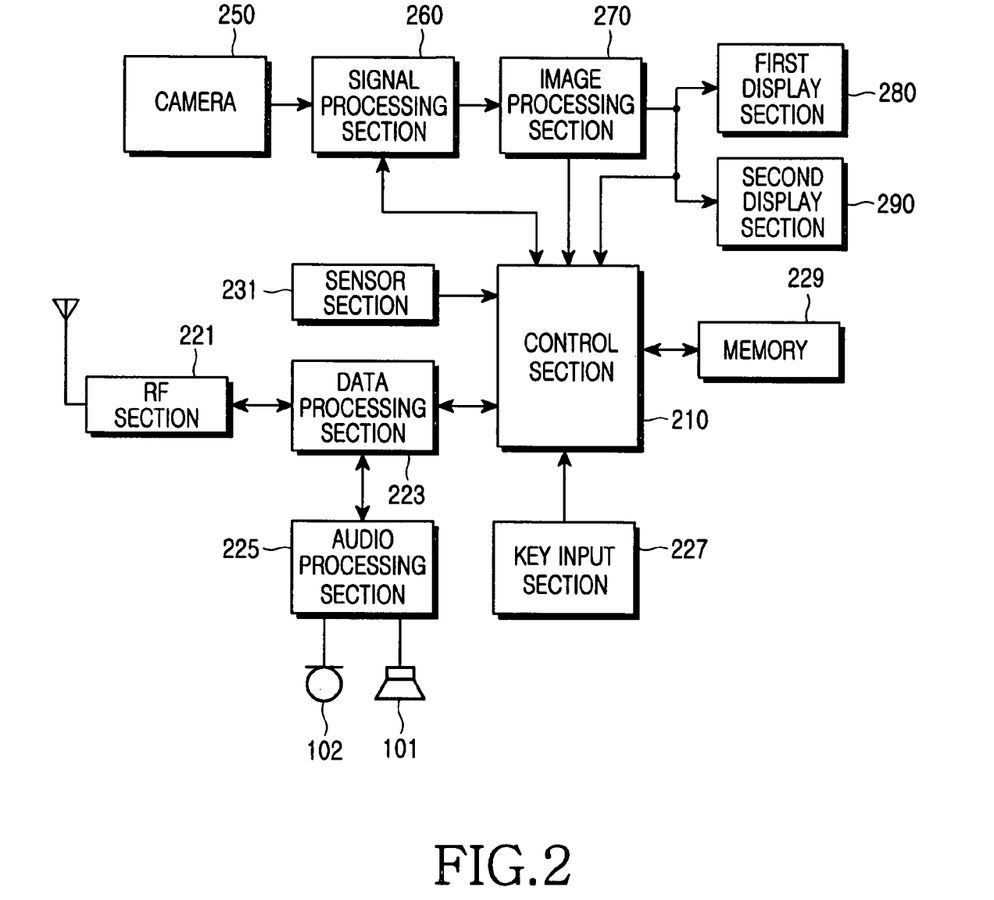
FIG. 2 is a block diagram illustrating an example of an internal structure of a rotation touch phone having a camera according to an embodiment of the present invention.

FIG. 2 is a block diagram illustrating an example of an internal structure of the rotation touch phone having the camera according to an embodiment of the present invention. Hereinafter, the internal structure of the rotation touch phone will be described with reference to FIGS. 1A and 2.

Referring to FIG. 2, an RF section 221 is provided to allow the rotation touch phone to make a communication, e.g., a phone call. The RF section 221 includes an RF transmitter (not shown) for boosting and amplifying the frequency of a transmitted signal, and an RF receiver (not shown) for low-noise amplifying a received signal and reducing the frequency of the received signal. A data processing section 223 includes a transmitter (not shown) for encoding and modulating the transmitted signal and a receiver (not shown) for decoding and demodulating the received signal. In addition, the data processing section 223 comprises a modulator/demodulator (MODEM) (not shown) and a coder/decoder (CODEC) (not shown). An audio processing section 225 reproduces an audio signal output from the data processing section 223 or transmits an audio signal generated from the microphone 102 to the data processing section 223.

The key input section 227 includes the following keys which are not shown input keys for inputting numerical numbers and character information and various functional keys for setting various functions. The key input section 227 has a navigation key for selecting a menu, a call key for making a communication, and an end key for finishing the communication. In addition, according to an embodiment of the present invention, the key input section 227 has the following keys which are not shown a speaker mode selecting key, a speak auto-mode selecting key, a speaker manual-mode selecting key and a camera mode selecting key. A memory 229 includes a program memory (not shown) and a data memory (not shown). The program memory stores programs for controlling an operation of the rotation touch phone having the camera. In addition, the data memory temporarily stores data created when the programs are executed. A control section 210 includes the data processing section 223 and controls the operation of the rotation touch phone having the camera. In addition, the control section 210 controls the operation of a liquid crystal display device 280 and 290, the key input section 227, and the touch screen, and allows the rotation touch phone to be placed into a speakerphone mode.

The sensor section 231 transfers signals detected by the first to third sensors 112, 113 and 114 to the control section 210. The sensors detect signals as the magnet 111 is detected via movement of the magnet 111 toward the sensors 112, 113 and 114.

The camera 250 photographs image data and has a camera sensor (not shown) for converting an optical signal to an electrical signal. The camera sensor includes a charge coupled device (CCD) sensor. It should be appreciated by those skilled in the art that although a camera 250 accommodated in the rotation touch phone is described, it is also possible to install a camera 250 to an exterior of the rotation touch phone without departing from the scope of the present invention. A signal processing section 260 converts a signal output from the camera 250 into an image signal. The signal processing section 260 includes a digital signal processor (not shown). An image processing section 270 generates screen data for displaying the image signal output from the signal processing section 260. The image processing section 270 transmits the image signal corresponding to sizes of the first and second display sections 280 and 290, and compresses or expands the image data.

The first and second display sections 280 and 290 display messages generated when the programs are executed under the control of the control section 210. The first and second display sections 280 and 290 include an LCD. In this case, the first and second display sections 280 and 290 include an LCD controller (not shown), a memory for storing data and an LCD display device. If a touch screen type LCD is adopted, the key input section 227 and the LCD serve as an input section. For example, if a speaker manual mode is selected, the user cannot use the key input section 227 in the fourth state. Therefore, the user inputs signals by using the touch screen. The first and second display sections 280 and 290 can be used to provide illumination for the camera 250 when the rotation touch phone is placed in a camera mode in second and third states, which will be described in detail with reference to FIG. 6.

Hereinafter, the operation of the rotation touch phone having the camera will be described. When placing a call, the user inputs a phone number through the key input section 227 and sets a call outgoing mode. Then, the control section 210 detects the call outgoing mode and processes phone number information through the data processing section 223, thereby outputting an RF signal through the RF section 221. If a receiver sends a response signal, the control section 210 detects the response signal through the RF section 221 and the data processing section 223. Then, a voice communication path is formed by means of the audio processing section 225 so that the user can establish communication with the receiver. In addition, when an incoming call is received, the control section 210 detects the incoming call through the data processing section 223, thereby generating a ring signal through the audio processing section 225. Then, if the user responds to the incoming call, the control section 210 establishes the voice communication path through the audio processing section 225, so that the user can establish communication with the transmitter. In addition, the data input can be performed by using the touch screen in the fourth state. In a communication-waiting mode or when text communication is performed, the control section 210 controls the data processing section 223 in such a manner that character data are displayed in the first and second display sections 280 and 290.

Figure 3:
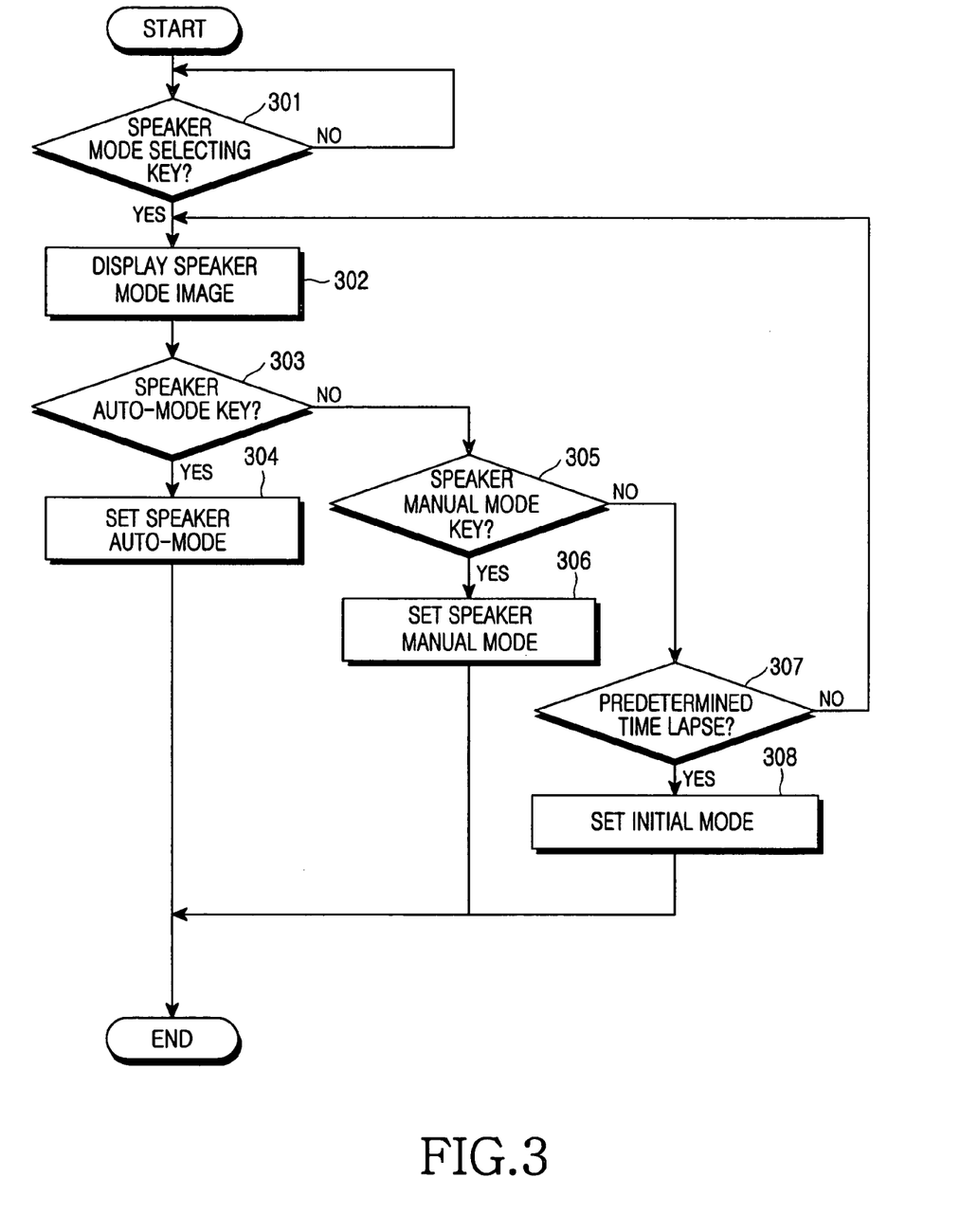
FIG. 3 is a flow chart illustrating an example of an operation of a rotation touch phone in a speaker mode according to an embodiment of the present invention.

FIG. 3 is a flow chart illustrating an example of an operation of the rotation touch phone in a speaker mode according to an embodiment of the present invention. Hereinafter, a process for setting the speak mode in which a speakerphone can be used will be described with reference to FIGS. 1A to 1C, 2 and 3.

Firstly, the control section 210 checks whether or not a key signal is input from the key input section 227 in step 301. If the input key signal is not a speaker mode selecting key signal, an initial state is maintained. If the input key signal is the speaker mode selecting key signal, a speaker mode image is displayed on the screen in step 302. The speaker mode selecting key signal is generated when the user pushes a speaker mode selecting key of the key input section 227 or touches the touch screen 291. The speaker mode selecting key includes a navigation key, a number key, and a special key. Although the present invention is mainly described with reference to key signals of the key input section 227, key signals of the touch screen are also utilized. In step 302, the speaker mode image is displayed on the first display section 280 or the second display section 290 under the control of the control section 210. The first and second display sections 280 and 290 display the speaker mode image as shown in FIG. 4.

Figure 4:
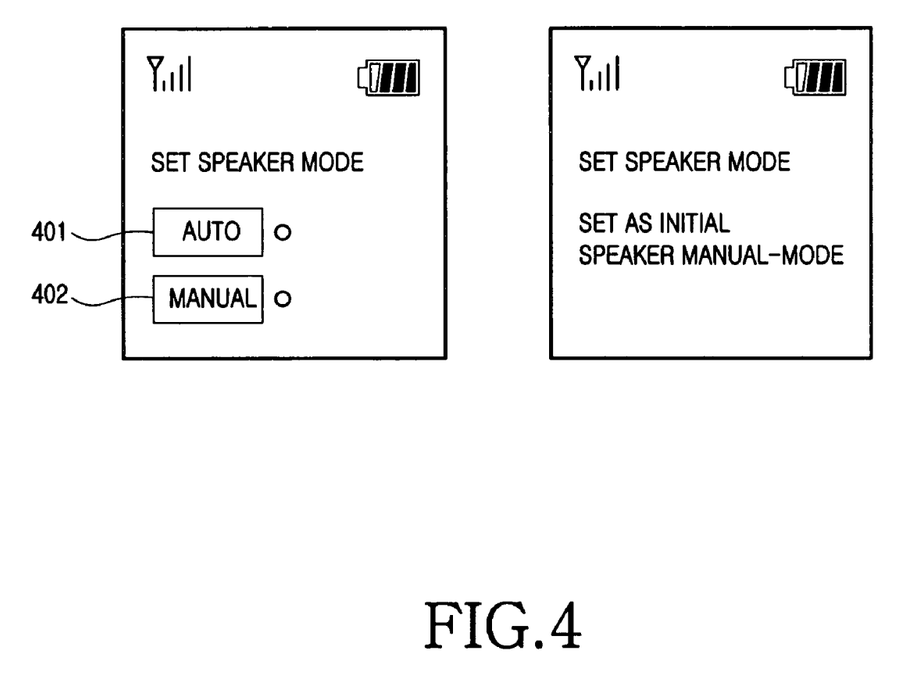
FIG. 4 is a block diagram illustrating an example of a speaker mode setting image displayed on a screen of a rotation touch phone in a speaker mode according to an embodiment of the present invention.

FIG. 4 is a block diagram illustrating an example of the speaker mode image displayed on the screen of the rotation touch phone in a speaker mode according to an embodiment of the present invention. Referring to FIG. 4, a speaker mode is divided into a speaker auto-mode and a speaker manual-mode. The user can select the speaker mode by using the key input section 227 or by touching an auto-mode 401 or a manual-mode 402 formed in the touch screen.

In step 303, the control section 210 determines whether or not the key signal is input from the key input section 227. If the input key signal is not a speaker auto-mode key signal, step 305 is performed. In addition, if the input key signal is the speaker auto-mode key signal, step 304 is performed. The speaker auto-mode key signal is generated when the user pushes a speaker auto-mode key 401 of the key input section 227. The speaker auto-mode key includes a navigation key for selecting a menu, a number key, and a special key. In step 304, the control section 210 sets the speaker auto-mode. The speaker auto-mode allows the user to make a communication by using the speaker 101 and the microphone 102, or by using only the speaker 101 depending on positions (first to fourth states) of the folder 121 in the rotation touch phone having the camera. The speaker auto-mode will be described in detail with reference to FIG. 5.

In step 305, the control section 210 determines whether or not the key signal is input from the key input section 227. If the input key signal is not a speaker manual-mode key signal, step 307 is performed. In addition, if the input key signal is the speaker manual-mode key signal, step 306 is carried out. The speaker manual-mode key signal is generated when the user pushes a speaker manual-mode key 402 of the key input section 227. The speaker manual-mode key includes a navigation key for selecting a menu, a number key, and a special key. In step 306, the control section 210 sets the speaker manual-mode. In the speaker manual-mode, the user operates the key input section 227 or the touch screen in order to use the speaker 101 and the microphone 102 (normal communication mode) or to use only the speaker 101 (speakerphone mode) depending on positions (first to fourth states) of the folder 121 in the rotation touch phone having the camera. The speaker manual-mode will be described in detail with reference to FIG. 5.

In step 307, the control section 210 determines whether or not predetermined time lapses have occurred. If a predetermined time has passed, the control section 210 performs step 308. Otherwise, step 302 is performed. The predetermined time lapse refers to the key signal not being input from the key input section 227 during the speaker mode. In step 308, the control section 210 sets the initial speaker mode. The initial speaker mode refers to the speaker auto-mode or the speaker manual-mode, which has not been previously set. For example, if a previous mode is the speaker manual-mode, a notification "set as initial speaker manual-mode" is displayed in the first display section 280 or in the second display section 290 as shown in FIG. 4.

Figure 5:
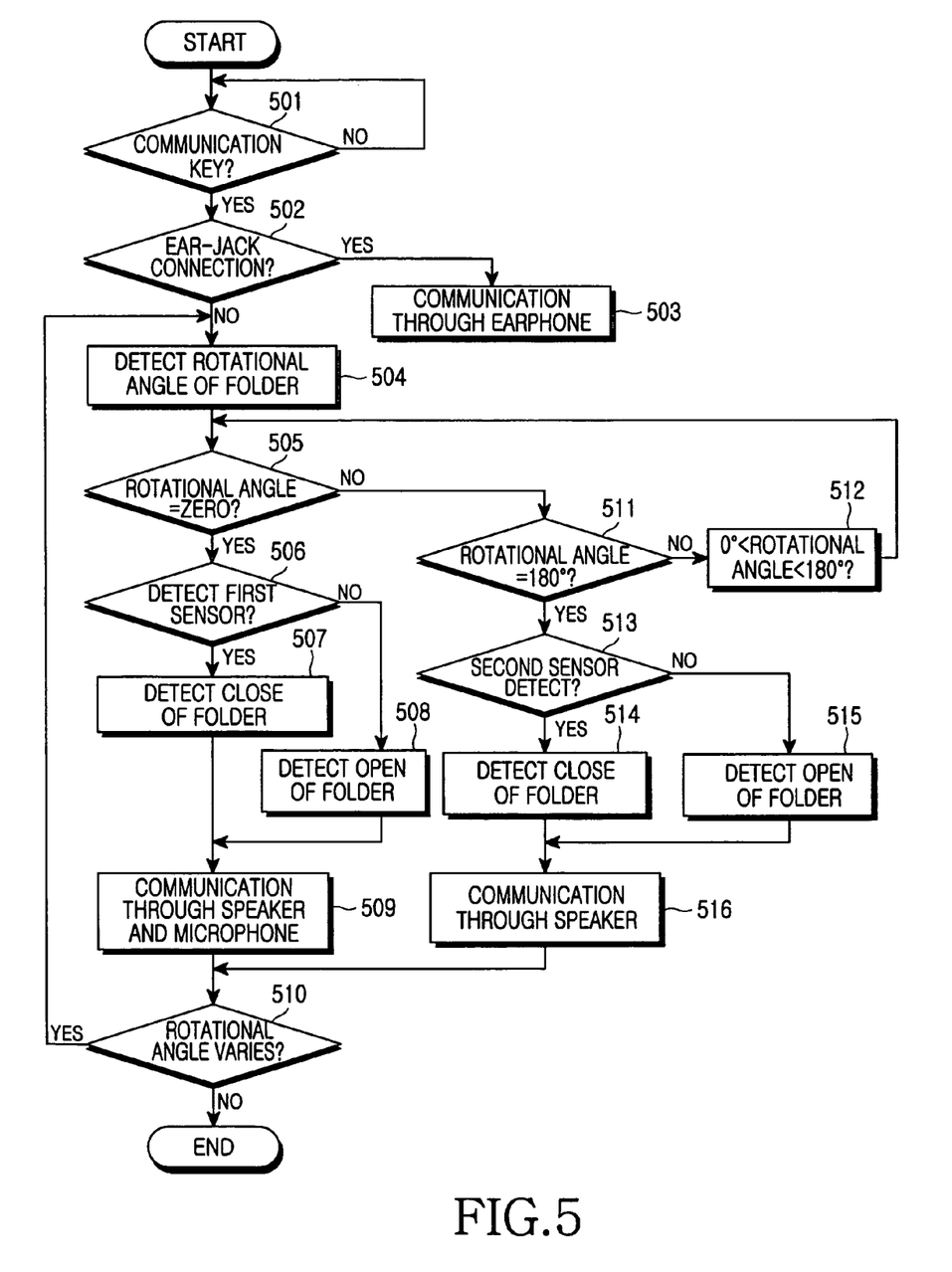
FIG. 5 is a flow chart illustrating an example of a method for placing a rotation touch phone in a speakerphone mode of operation according to an embodiment of the present invention.

FIG. 5 is a flow chart illustrating an example of a method for placing the rotation touch phone in a speakerphone mode of operation according to an embodiment of the present invention. Hereinafter, a method for making communication by using the speakerphone in the speaker auto-mode and speaker manual-mode will be described with reference to FIG. 5. An operation of the control section 210 in the speaker auto-mode will be described.

In step 501, the control section 210 determines whether or not the key signal is input from the key input section 227. If the input key signal is not a communication key signal, an initial state is maintained. If the input key signal is the communication key signal, step 502 is performed. The communication key signal refers to a key signal requiring a communication. The communication key includes an identification key having a side-key, a number key and a special key.

In step 502, the control section determines whether or not an earphone 104 is connected to the ear-jack 103. If the earphone 104 is not connected to the ear-jack 103, step 504 is performed. If the earphone 104 is connected to the ear-jack 103, step 503 is performed. In step 503, the control section 210 allows the user to make a communication through the earphone 104.

The control section 210 detects a rotational angle (rotational position) of the folder 121 in step 504 and then proceeds to step 505. The rotational angles (rotational positions) of the folder 121 can be classified into a zero angle, a 180 degree angle, and an angle between zero and 180 degrees. The zero angle represents either the first state or the second state. The 180 degree angle represents either the third state or the fourth state. The angle between zero and 180 degree represents a state in which the folder 121 is being rotated or brought to a halt while being rotated, which corresponds to neither of the first to fourth states. Herein, the angle between zero and 180 degrees can be recognized by means of the third sensor 114. That is, the angle between zero and 180 degrees represents neither of the first to fourth states but a state in which the third sensor 114 has not detected the magnet 111. The first to fourth states have been described above.

In step 505, the control section 210 determines whether or not the rotational angle of the folder 121 is zero. If the rotational angle of the folder 121 is not zero, the control section 210 performs out step 511. In addition, if the rotational angle of the folder 121 is zero, the control section 210 performs step 506. Checking the rotational angle of the folder 210 by using the control section 210 means that the control section 210 detects the position of the folder 121. That is, the control section 210 detects signals input from the sensor section 231 having the first to third sensors 112, 113 and 114, thereby determining the first to fourth states of the folder 121.

In step 506, the control section 210 determines whether or not the sensor section 231 detects the signal from the first sensor 112. If the sensor section 231 does not detect the signal from the first sensor 112, step 508 is performed. In addition, if the sensor section 231 detects the signal from the first sensor 112, the control section 210 performs step 507. Step 507 represents the first state, in which the folder 121 is closed and only the first sensor 112 detects the magnet 111. Step 508 represents the second state, in which the folder 121 is opened and none of the first to third sensors 112 to 114 detect the magnet. Then, the sensor section 231 determines whether or not the first sensor 112 has detected the magnet 111. If the first sensor 112 does not detect the magnet 111, the sensor section 231 does not transfer a signal to the control section. In addition, if the first sensor 112 detects the magnet 111, the sensor section 231 transfers a signal to the control section 210 indicating that the sensor section 231 detects the signal from the first sensor 112.

In step 507, the control section 210 detects the closing of the folder 121 and performs step 509. In addition, in step 507, the control section 210 detects the first state of the folder 121. In step 508, the control section 210 detects the opening of the folder 121 and performs step 509. Also, in step 508, the control section 210 detects the second state of the folder 121. In step 509, the control section 210 detects the first or second state of the folder 121, thereby allowing the user to establish communication through the speaker 101 and a microphone 102, and then, performs step 510. That is, in step 509, the user can establish communication with other users through the speakerphone (speaker 101) in the first state. In addition, the user can establish communication with other users through the speakerphone or through the speaker 101 and the microphone 102 in the second state.

In step 511, the control section 210 determines whether or not the rotational angle of the folder 121 is 180 degrees or about 180 degrees. If the rotational angle of the folder 121 is not 180 degrees or about 180 degrees, step 512 is performed. In addition, if the rotational angle of the folder 121 is 180 degrees or about 180 degrees, the control section 210 performs step 513. Checking the rotational angle of the folder 210 by using the control section 210 means that the control section 210 detects the position of the folder 121. That is, the control section 210 detects signals input from the sensor section 231 having the first to third sensors 112, 113 and 114, thereby determining the first to fourth states of the folder 121. Specifically, when the third sensor 114 detects the magnet 111, the control section decides that the rotational angle of the folder 121 is 180 degrees or about 180 degrees.

In step 513, the control section 210 determines whether or not the sensor section 231 detects signals from the second and third sensors 113 and 114. If the sensor section 231 detects only the signal from the third sensor 114, step 515 is performed. In contrast, if the sensor section 231 detects the signals from both the second and third sensors 113 and 114, the control section 210 performs step 514. Then, the sensor section 231 determines whether or not the second sensor 113 detects the magnet 111. If the second sensor 113 does not detect the magnet 111, the sensor section 231 does not transfer a signal to the control section 210. In contrast, if the second sensor 114 detects the magnet 111, the sensor section 231 transfers a signal to the control section 210 indicating that the sensor section 231 has detected the signal from the second sensor 113.

In step 514, the control section 210 detects the closing of the folder 121 and performs step 516. In step 514, the control section 210 detects the fourth state of the folder 121 in which both the second and third sensors 113 and 114 detect the magnet 111. In step 515, the control section 210 detects opening of the folder 121 and performs step 516. In step 515, the control section 210 detects the third state of the folder 121 in which only the third sensor 114 detects the magnet 111. In step 516, the control section 210 detects the third and fourth states of the folder 121, thereby allowing the user to make a communication through the speakerphone (speaker 101), and then, carries out step 510.

In step 510, the control section 210 determines whether or not the rotational angle of the folder is changing while communication is being established with other users. If the rotational angle of the folder is not changing while communication is being established with other users, the process is finished. In addition, if the rotational angle of the folder is changing while establishing communication with other users, the control section 210 repeatedly performs step 504. The completion of the process means that step 509 or step 516 is maintained. In addition, the variation of the rotational angle of the folder refers to the user rotating the folder 121 while establishing communication. For example, the user may establish communication with other users in the second state by using the speaker 101 and the microphone 102. However, if the user rotates the folder 121 at an angle of 180 degrees or about 180 degrees (third state), or closes the rotated folder 121 (fourth state), the control section 210 allows the user to establish communication through the speakerphone (speaker 101). That is, the user establishes communication by using the microphone 102 and the speaker in the second state, and establishes communication by using the speakerphone (speaker 101) in the third or fourth state. For example, if the folder position is changed from the second state to the third state, the control section 210 automatically converts the rotation touch phone into a speakerphone mode, thereby allowing the user to continuously establish communication with other users.

Hereinafter, an operation of the control section 210 in the speaker manual-mode will be described with reference to FIGS. 1A and 2. As described above, the first state refers to the folder 121 being closed, the second state refers to the folder 121 being opened in an "A" direction as shown in FIG. 1A, the third state refers to the folder 121 being rotated in a "B" direction as shown in FIG. 1A from the second state, and the fourth state refers to the folder 121 being closed in a "C" direction as shown in FIG. 1B from the third state.

The speaker manual-mode allows the user to establish communication with other users by using the speaker 101 and the microphone 102, or by using the speaker 101 through inputting key signals into the key input section 227 or touching the touch screen. The following description is described on the assumption that the user sets the speaker manual-mode and an incoming call is received from a transmitter.

Firstly, the control section 210 determines whether or not the key signal of the key input section 227 or the touch signal of the touch screen is input. As a result of the determining, if the input signal is not a response signal for the incoming call, an initial state is maintained. In contrast, if the input signal is the response signal for the incoming call, the control section 210 forms a communication path for allowing the user to make communication with the transmitter.

When forming the communication path between the user and the transmitter, if the folder 121 is in the first state, the user opens the folder 121 (second state) to communicate with the transmitter. If the folder 121 is in the second state, the user inputs the key signal of the key input section 227 and the touch signal of the touch screen to communicate with the transmitter. In the third state, the user inputs the key signal of the key input section 227 and the touch signal of the touch screen to communicate with the transmitter. In the fourth state, the user pushes a side-key of the key input section 227 or touches a communication section of the touch screen to communicate with the transmitter.

In the fourth state, the user is required to use the speakerphone in order to communicate with the transmitter, so that the user touches a speaker section formed on the touch screen or pushes the key of the key input section to communicate with the transmitter through the speakerphone (speaker 101).

Figure 6:
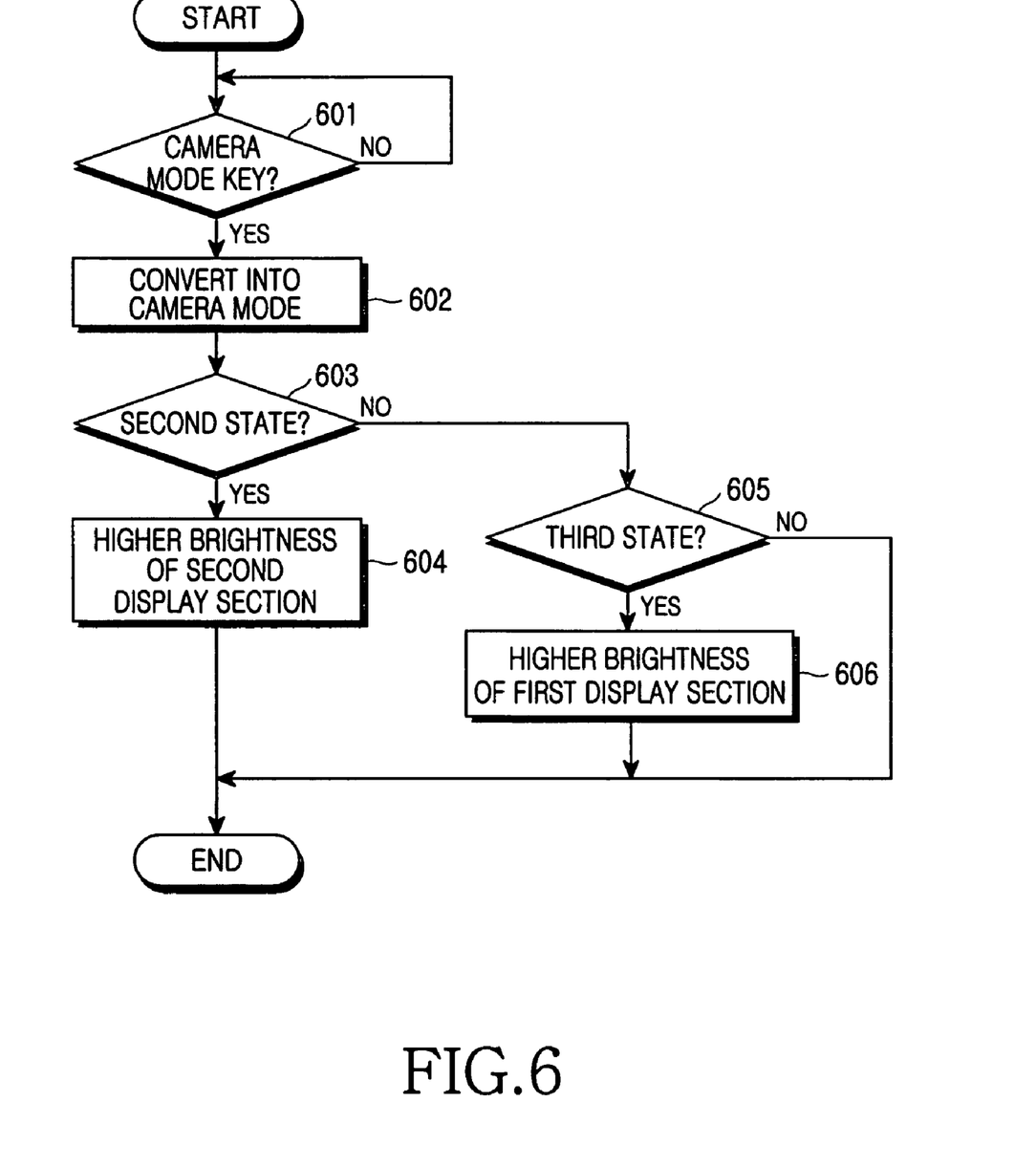
FIG. 6 is a flow chart illustrating an example of showing a method for utilizing a display section as an illumination when photographing an object by using a rotation touch phone having a camera according to an embodiment of the present invention.

FIG. 6 is a flow chart illustrating an example of a method for utilizing the display section as an illumination when photographing an object by using the rotation touch phone according to another embodiment of the present invention. Hereinafter, the method for utilizing the first or second display section 280 or 290 as the illumination when photographing the object will be described with reference to FIGS. 1A, 1B, 2 and 6.

Firstly, the control section determines whether or not a camera mode key signal is input from the key input section 227 in step 601. If the signal input from the key input section 227 is not the camera mode key signal, an initial state is maintained. In addition, if the signal input from the key input section 227 is the camera mode key signal, the control section performs step 602. In step 602, the control section converts the rotation touch phone into a camera mode and performs step 603. The camera mode relates to the photographing work of the camera 250, and allows the user to easily preview images or conveniently photograph the object.

In step 603, the control section determines whether or not the folder 121 is positioned in the second state. If the folder 121 is not positioned in the second state, step 605 is performed. In addition, if the folder 121 is positioned in the second state, the control section performs step 604. In the second state, the folder 121 is opened in the "A" direction as shown in FIG. 1A. In step 604, the control section controls the second display section 290 in such a manner that the second display section 290 radiates light having a higher brightness. That is, when the photographing direction of the camera 250 is formed in the "F" direction as shown in FIG. 1F, the control section 210 controls the second display section 290 to radiate light having brightness higher than brightness of general use, thereby facilitating the photographing work of the camera 250. To recognize the second state of the folder 121, the control section 210 determines whether or not the sensor section 231 detects signals generated from the first to third sensors 112, 113 and 114. If the sensor section 231 does not detect the signals from the first to third sensors 112, 113 and 114, the sensor section 231 cannot transfer a signal to the control section 210, so the control section 210 determines that the folder 121 is positioned in the second state.

In step 605, the control section 210 checks whether or not the folder 121 is positioned in the third state. If the folder 121 is not positioned in the third state, the control section 210 finishes the process. In addition, if the folder 121 is positioned in the third state, the control section 210 carries out step 606. The third state of the folder 121 is achieved by rotating the folder 121 in the "B" direction from the second state as shown in FIG. 1B.

In step 606, the control section 210 controls the first display section 280 in such a manner that the first display section 280 radiates light having higher brightness. That is, when the photographing direction of the camera 250 is formed in the "F" direction as shown in FIG. 1F, the control section 210 controls the first display section 280 to radiate light having brightness higher than brightness of general use, thereby facilitating the photographing work of the camera 250. To recognize the third state of the folder 121, the control section 210 determines whether or not the sensor section 231 detects signals generated from the first to third sensors 112, 113 and 114. If the sensor section 231 does not detect the signals from the first and second sensors 112 and 113, but detect the signal from the third sensor 114, the sensor section 231 transfers a signal to the control section 210 indicating that the sensor section 231 detects the signal from the third sensor 114, so the control section 210 determines that the folder 121 is positioned in the third state.

As shown in FIG. 1F, if the user photographs the object in the "F" direction by using the camera 250, the first or second display section 280 or 290 radiates light having brightness remarkably stronger than brightness of general use in the "H" direction.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for detecting a folder position in a rotation touch phone having a camera, the rotation touch phone including a sensor section, a folder, a body, and a connecting section, the folder having a magnet, the sensor section including first, second and third sensors for detecting the magnet, the first and second sensors being located on the body and the third sensor being located on the connecting section, the connecting section connecting the folder to the body, the folder being movable from first, second, third and fourth states, the first state signifying a state in which the folder is initially closed, the second state signifying a state in which the folder has been opened from the first state, the third state signifying a state in which the folder has been rotated substantially 180 degrees from the second state, the fourth state signifying a state in which the folder has been closed from the third state, wherein the orientation of the folder with respect to the body in the fourth state is different than the orientation of the folder with respect to the body in the first state, the method comprising:

receiving a signal from the sensor section notifying that the sensor section detects the magnet;

deciding that the folder is in the first state in which the folder is closed, when only the first sensor detects the magnet;

deciding that the folder is in the second state in which the folder has been opened, when none of the first to third sensors detect the magnet;

deciding that the folder is in the third state in which the folder has been rotated substantially 180 degrees, when only the third sensor detects the magnet; and deciding that the folder is in the fourth state in which the folder is closed, when both the second and third sensors detect the magnet.

2. The method as claimed in claim 1, further comprising:

transferring a signal notifying that the first sensor detects the magnet;

transferring a signal notifying that the second sensor detects the magnet; and transferring a signal notifying that the third sensor detects the magnet.

3. A method for converting a mode of a rotation touch phone having a camera into a speakerphone mode by detecting a folder position, the rotation touch phone including a sensor section, a folder, a body, and a connecting section, the folder having a magnet and a bi-directional speakerphone, the sensor section including first, second and third sensors for detecting the magnet, the first and second sensors being located on the body and the third sensor being located on the connecting section, the connecting section having the camera and connecting the folder to the body, the folder being movable from first, second, third and fourth states, the first state signifying a state in which the folder is initially closed, the second state signifying a state in which the folder has been opened from the first state, the third state signifying a state in which the folder has been rotated substantially 180 degrees from the second state, the fourth state signifying a state in which the folder has been closed from the third state, wherein the orientation of the folder with respect to the body in the fourth state is different than the orientation of the folder with respect to the body in the first state, the method comprising:

deciding that the folder is in the first state in which the folder is closed, when only the first sensor detects the magnet;

deciding that the folder is in the second state in which the folder has been opened, when none of the first to third sensors detect the magnet;

deciding that the folder is in the third state in which the folder has been rotated substantially 180 degrees, when only the third sensor detects the magnet; and deciding that the folder is in the fourth state in which the folder is closed, when both the second and third sensors detect the magnet converting the mode of the rotation touch phone into the speakerphone mode when the folder is in the first state; and converting the mode of the rotation touch phone into the speakerphone mode when the folder is in the fourth state.

4. A method for utilizing first and second display sections as an illumination source when photographing an object by detecting a position of a folder in a rotation touch phone having a rotatable camera, the rotation touch phone including a sensor section, a folder, a body, and a connecting section, the folder having a magnet and the first and second display sections, the sensor section including first, second, and third sensors for detecting the magnet, the first and second sensors being located on the body and the third sensor being located on the connecting section, the connecting section connecting the folder to the body and having the camera, the folder being movable from first, second, third and fourth states, the first state signifying a state in which the folder is initially closed, the second state signifying a state in which the folder has been opened from the first state, the third state signifying a state in which the folder has been rotated substantially 180 degrees from the second state, the fourth state signifying a state in which the folder has been closed from the third state, wherein the orientation of the folder with respect to the body in the fourth state is different than the orientation of the folder with respect to the body in the first state, the method comprising:

deciding that the folder is in the first state in which the folder is closed, when only the first sensor detects the magnet;

deciding that the folder is in the second state in which the folder has been opened, when none of the first to third sensors detect the magnet;

deciding that the folder is in the third state in which the folder has been rotated substantially 180 degrees, when only the third sensor detects the magnet;

deciding that the folder is in the fourth state in which the folder is closed, when both the second and third sensors detect the magnet; and utilizing at least one of the first and second display sections as the illumination source when the folder is in at least one of the second and third states.

5. The method as claimed in claim 4, further comprising:
utilizing the second display section as the illumination source when the folder is in the second state; and
utilizing the first display section as the illumination source when the folder is in the third state.

6. A rotation touch phone comprising a folder, a body, and a connecting section, comprising:

a camera for taking pictures for the rotation touch phone;
first and second display sections for inputting and outputting information for the rotation touch phone;
a sensor section for detecting a position of a magnet disposed on the folder section, the sensor section including first, second and third sensors, the first and second sensors being located on the body and the third sensor being located on the connecting section;
the folder being for moving from first, second, third and fourth states, the first state signifying a state in which the folder section is initially closed, the second state signifying a state in which the folder section has been opened from the first state, the third state signifying a state in which the folder section has been rotated substantially 180 degrees from the second state, the fourth state signifying a state in which the folder section has been closed from the third state, wherein the orientation of the folder with respect to the body in the fourth state is different than the orientation of the folder with respect to the body in the first state; and
a controller for receiving a signal from the sensor section indicating that the sensor section detects the magnet, deciding that the folder is in the first state in which the folder is closed, when only the first sensor detects the magnet, deciding that the folder is in the second state in which the folder has been opened, when none of the first to third sensors detect the magnet, deciding that the folder is in the third state in which the folder has been rotated substantially 180 degrees, when only the third sensor detects the magnet, and deciding that the folder is in the fourth state in which the folder is closed, when both the second and third sensors detect the magnet.

7. The apparatus of claim 6, wherein the controller is further for:
transferring a signal indicating that the first sensor detects the magnet;
transferring a signal indicating that the second sensor detects the magnet; and
transferring a signal indicating that the third sensor detects the magnet.

8. A rotation touch phone, having a speakerphone, for converting into a speakerphone mode by detecting a folder position, the rotation touch phone including a sensor section, a folder, a body; and a connecting section, the folder having a magnet and a bi-directional speakerphone, the sensor section including first, second and third sensors for detecting the magnet, the first and second sensors being located on the body and the third sensor being located on the connecting section, the connecting section having the camera and connecting the folder to the body, the folder being movable from first, second, third and fourth states, the first state signifying a state in which the folder is initially closed, the second state signifying a state in which the folder has been opened from the first state, the third state signifying a state in which the folder has been rotated substantially 180 degrees from the second state, the fourth state signifying a state in which the folder has been closed from the third state, wherein the orientation of the folder with respect to the body in the fourth state is different than the orientation of the folder with respect to the body in the first state, the rotation touch phone comprising:

a controller for deciding that the folder is in the first state in which the folder is closed, when only the first sensor detects the magnet, deciding that the folder is in the second state in which the folder has been opened, when none of the first to third sensors detect the magnet, deciding that the folder is in the third state in which the folder has been rotated substantially 180 degrees, when only the third sensor detects the magnet, deciding that the folder is in the fourth state in which the folder is closed, when both the second and third sensors detect the magnet, converting the mode of the rotation touch phone into the speakerphone mode when the folder is in the first state, and
converting the mode of the rotation touch phone into the speakerphone mode when the folder is in the fourth state.

9. A touch tone phone having a rotatable camera that utilizes first and second display sections as an illumination source when photographing an object by detecting a position of a folder in the rotation touch phone, the rotation touch phone including a sensor section, a folder, a body, and a connecting section, the folder having a magnet and the first and second display sections, the sensor section including first, second, and third sensors for detecting the magnet, the first and second sensors being located on the body and the third sensor being located on the connecting section, the connecting section connecting the folder to the body and having the camera, the folder being movable from first, second, third and fourth states, the first state signifying a state in which the folder is initially closed, the second state signifying a state in which the folder has been opened from the first state, the third state signifying a state in which the folder has been rotated substantially 180 degrees from the second state, the fourth state signifying a state in which the folder has been closed from the third state, wherein the orientation of the folder with respect to the body in the fourth state is different than the orientation of the folder with respect to the body in the first state, the touch tone phone comprising:

a controller for deciding that the folder is in the first state in which the folder is closed, when only the first sensor detects the magnet, deciding that the folder is in the second state in which the folder has been opened, when none of the first to third sensors detect the magnet, deciding that the folder is in the third state in which the folder has been rotated substantially 180 degrees, when only the third sensor detects the magnet, deciding that the folder is in the fourth state in which the folder is closed, when both the second and third sensors detect the magnet, and utilizing at least one of the first and second display sections as the illumination source when the folder is in at least one of the second and third states.

10. The touch tone phone of claim 9, wherein the controller is further for utilizing the second display section as the illumination source when the folder is in the second state, and the controller is further for utilizing the first display section as the illumination source when the folder is in the third state.

* * * * *